UNITED STATES PATENT OFFICE.

FILIP KAČER, OF MANNHEIM, GERMANY, ASSIGNOR TO BADISCHE ANILIN & SODA FABRIK, OF LUDWIGSHAFEN-ON-THE-RHINE, GERMANY, A CORPORATION OF BADEN.

ANTHRACENE COMPOUND AND PROCESS OF MAKING SAME.

970,340. Specification of Letters Patent. Patented Sept. 13, 1910.

No Drawing. Application filed June 9, 1910. Serial No. 565,938.

*To all whom it may concern:*

Be it known that I, FILIP KAČER, Ph. D., chemist, a subject of the King of Prussia, residing at Mannheim, Germany, have invented new and useful Improvements in Anthracene Compounds and Processes of Making Same, of which the following is a specification.

The specification of German Patent No. 162,824 describes the production of compounds of the anthracene series by condensing a halogenized anthraquinone derivative with an amino-anthraquinone derivative, and it is stated in the said specification that the new compounds are of use as parent materials for the production of new coloring matters. I have now discovered that a particular one of the compounds obtainable according to the said specification, namely 2.2'-dimethyl-1.1'-dianthraquinonylamin, on being subjected to the action of a suitable reducing agent, such for instance as alkaline hydrosulfite, gives rise to a new compound which is the leuco compound of 2.2'-dimethyl-1.1'-dianthraquinonylamin.

My new compound is of use for the production of pink shades on vegetable fiber, for on being applied to such fiber it is fixed thereon and can then be converted into the original compound, giving rise to clear pink shades of excellent fastness.

My new compound is characterized by being soluble in caustic alkali solution, and after having been applied to vegetable fiber and then converted into the original compound the shades thus obtained remain practically unaltered on being touched with dilute caustic soda solution, or with sodium hypochlorite solution, or with dilute hydrochloric acid, or with dilute nitric acid, but on being touched with alkaline hydrosulfite solution give rise to a yellowish brown spot.

The following examples will serve to illustrate further the nature of my invention and how it can be carried into practical effect, but the invention is not limited to these examples.

Example 1: Suspend six kilograms of a ten per cent. paste of 2.2'-dimethyl-1.1'-dianthraquinonylamin in one thousand liters of water, and add two liters of a twenty-four per cent. solution of caustic soda, twenty liters of a solution of hydrosulfite (containing one hundred and thirty grams of sodium hydrosulfite and sixty cubic centimeters of twenty-four per cent. caustic soda solution for every liter of water used), and forty kilograms of Glauber salt. When reduction is complete, the product contains my new compound in solution. In order to make use of it, introduce vegetable fiber into the vat; dye for thirty minutes while cold, and then wash, soap, and dry the goods.

Example 2: Mix together one hundred grams of a ten per cent. paste of 2.2'-dimethyl-1.1'-dianthraquinonylamin, forty grams of stannous oxid (in the form of a fifty per cent. paste), fifty grams of glycerin, and eight hundred and ten parts of alkaline thickening (prepared from three hundred and twenty grams of a sixty per cent. dextrin thickening, three hundred and forty grams of a fifty per cent. gum thickening, and one liter of forty-one per cent. caustic soda solution). Print this paste on to the printed goods, and dry the printed goods at a temperature of from forty, to fifty, degrees centigrade, and then steam them for five minutes in a Mather-Platt apparatus, and then wash and dry the said goods. During the operation, my new leuco compound is formed and is fixed on the fiber, and is subsequently converted into the original 2.2'-dimethyl-1.1'-dianthraquinonylamin.

Now what I claim is:—

1. The process of producing a leuco compound of 2.2'-dimethyl-1.1'-dianthraquinonylamin by treating the said 2.2'-dimethyl-1.1'-dianthraquinonylamin with a suitable reducing agent, substantially as hereinbefore described.

2. The process of producing a leuco compound of 2.2'-dimethyl-1.1'-dianthraquinonylamin by treating the said 2.2'-dimethyl-1.1'-dianthraquinonylamin with alkaline hydrosulfite solution.

3. As a new article of manufacture a leuco-compound of 2.2'-dimethyl-1.1'-dianthraquinonylamin, which new compound is soluble in caustic alkali solution and on being applied to vegetable fiber and then converted into the original compound gives rise to clear pink shades of excellent fastness, the said shades remaining practically unaltered on being touched with dilute caustic soda solution, or with sodium hypochlorite solution, or with dilute hydrochloric acid, or with dilute nitric acid, but on being touched with alkaline hydrosulfite solution give rise to a yellowish brown spot.

In testimony whereof I have hereunto set my hand in the presence of two subscribing witnesses.

FILIP KAČER.

Witnesses:
J. ALEC. LLOYD,
ERNEST L. IVES.